No. 818,599. PATENTED APR. 24, 1906.
S. E. BAILOR & F. M. ASHE.
DRAFT EQUALIZER.
APPLICATION FILED JUNE 1, 1905.
3 SHEETS—SHEET 1.
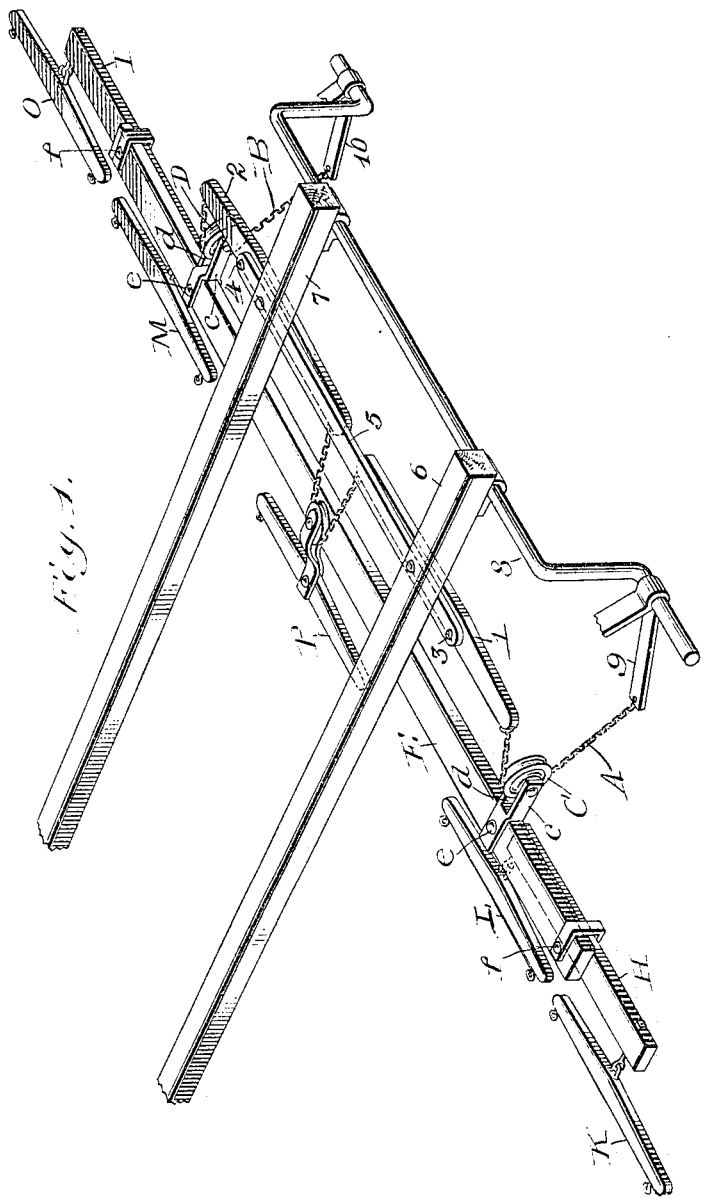
Attest:
D. E. Burdine
Inventors
S. E. Bailor
F. M. Ashe
By P. T. Dodge
Atty

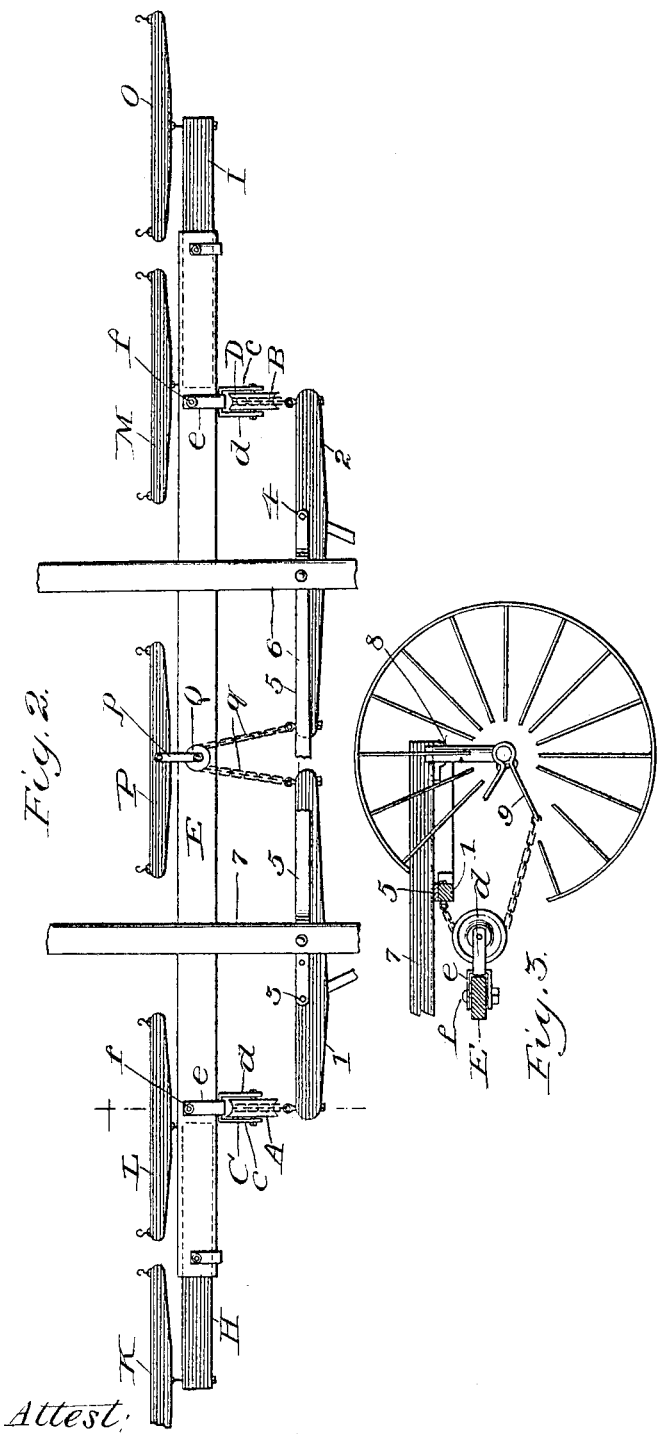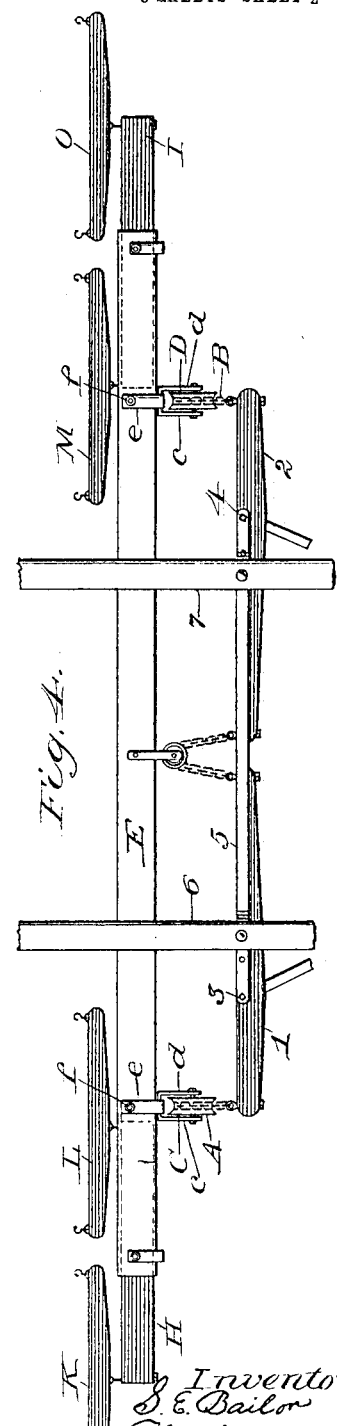

No. 818,599. PATENTED APR. 24, 1906.
S. E. BAILOR & F. M. ASHE.
DRAFT EQUALIZER.
APPLICATION FILED JUNE 1, 1905.
3 SHEETS—SHEET 3.
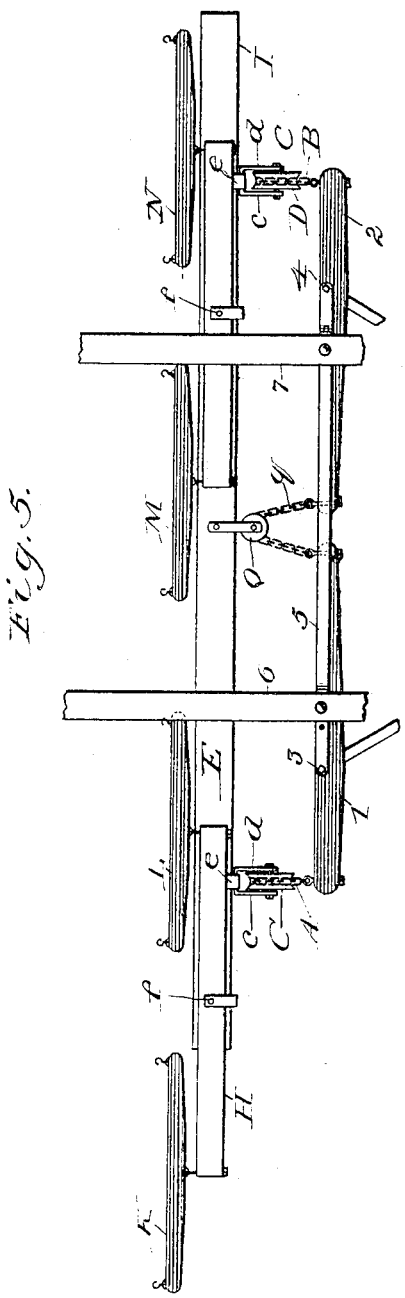
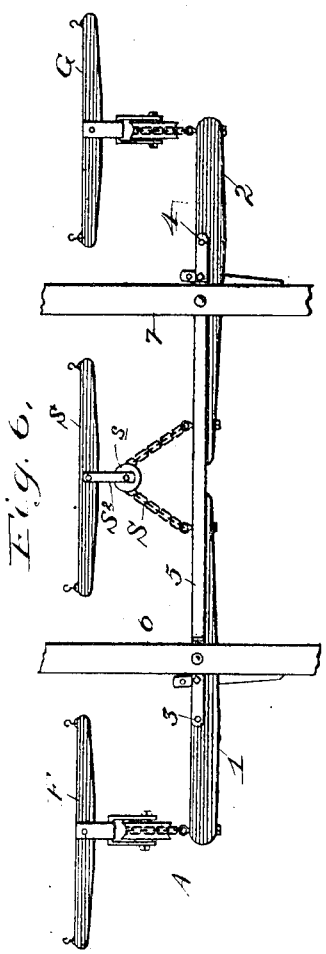

UNITED STATES PATENT OFFICE.

SILAS E. BAILOR AND FRED M. ASHE, OF TARKIO, MISSOURI.

DRAFT-EQUALIZER.

No. 818,599.        Specification of Letters Patent.        Patented April 24, 1906.

Application filed June 1, 1905. Serial No. 263,258.

*To all whom it may concern:*

Be it known that we, SILAS E. BAILOR and FRED M. ASHE, of Tarkio, county of Atchison, and State of Missouri, have invented a new and useful Improvement in Draft-Equalizers, of which the following is a specification.

This invention relates to draft eveners or equalizers for the purpose of attaching two or more draft-animals abreast to a vehicle and equalizing the pull or strain thereon; and the invention consists of the improved features of construction, as will be fully described hereinafter, by which three or more draft-animals may be attached to the vehicle in such manner as to effectually equalize the draft thereon and properly apportion the strain among the animals.

The invention consists also of improved means for applying the draft so as to eliminate the "neck-weight" on the animals.

The invention consists also in the details of construction and combination of parts hereinafter described and claimed.

In the accompanying drawings, Figure 1 is a perspective view of our improved device applied to a double-tongued vehicle and rigged for the attachment of five horses abreast. Fig. 2 is a top plan view of the same. Fig. 3 is a vertical longitudinal sectional elevation on the line $a\,a$ of Fig. 2. Fig. 4 is a top plan view of the device arranged for the attachment of four horses, two at the outer side of each tongue. Fig. 5 is a top plan view of the device arranged for the attachment of four horses where one travels between the tongues. Fig. 6 is a top plan view of the device with the equalizing-bar omitted and the parts arranged to provide for the attachment of three horses.

Referring to the drawings, in its essential features our improved evener embodies two evener-levers 1 and 2, pivotally connected on some fixed part of the machine or vehicle to be drawn and arranged end to end, chains or ropes A and B, attached at one of their ends to the extremities of said evener-levers and at their opposite ends to the frame of the machine, guides or pulleys C and D, over which said chains or ropes pass, a suitable connection between the inner ends of the evener-levers, and draft devices for the attachment of the draft-animals applied to the guides or pulleys, the said draft devices consisting either of a long equalizing-bar E, as shown in Figs. 1 to 4, or swingletrees F and G, as shown in Fig. 6, the former arrangement being for the purpose of accommodating four or more horses, while the latter arrangement is for the purpose of attaching three horses, as will be more fully described hereinafter.

Referring now particularly to Figs. 1, 2, and 3, it will be seen that the two evener-levers 1 and 2 are pivotally connected, as at 3 and 4, to a horizontal transverse bar 5, extending beneath and firmly secured to two tongues 6 and 7, which are in turn connected with the frame of the machine, in the present instance to an arched axle 8, Fig. 3, and which tongue may be braced from the axle in any suitable manner.

The chains A and B are attached at their upper ends to the outer extremities of the evener-levers, whence they extend forward, then downward around the pulleys C and D, and finally rearward, and have their lower ends connected, respectively, with the free ends of two downwardly and forwardly extending draft-arms 9 and 10, rigidly connected at their opposite ends with the axle of the machine. By thus connecting the chairs with the downwardly-extending draft-arms the pull on the chains will be applied to the machine below the axis of the wheels and will have a lifting tendency on the frame, with the result that the weight or pressure on the necks of the animals will be relieved.

The pulleys C and D are each mounted in vertical positions between bearing-arms $c$ and $d$ on a horizontal plate or bracket $e$, which plates are pivoted to the equalizing-bar on vertical axes $f$ at points at the outer sides of the tongues. At its extremities the equalizing-bar E has connected with it doubletrees H and I, the doubletree H having connected with its ends swingletrees K and L and the doubletree I having connected with it swingletrees M and O, this arrangement providing for the attachment of two horses at the outer side of each tongue. The fifth horse travels between the tongues and is attached to a fifth swingletree P, connected with the forward end of a link $p$, having journaled on its rear end a horizontal pulley Q. A chain $q$ is passed around this pulley and has its ends connected, respectively, with the inner ends of the two evener-levers, this arrangement constituting a connection between the evener-levers of such character that the strain applied to one will be transmitted to the other. In this arrangement of our device the pull of the four horses on the outer extremities of the two evener-levers is resisted or equalized by the pull of the middle horse on the inner ends of said evener-levers, the pivotal connections or fulcrums of the evener-levers being such as to equally apportion the strain between the five animals.

It will be observed that in the action of the device the pull of the draft-animals is applied to the machine through the two chains A and B and near the opposite ends of the axle, so that the vehicle will be advanced evenly and uniformly and will not be subjected to side strains. In the event of a sudden pull of either of the two side teams the running connection between the inner ends of the evener-levers formed by the pulley and chain will prevent the strain from being received suddenly by the middle horse, and this running connection will transmit the pull of the team to the opposite evener-lever and through it to the machine at this side, so that notwithstanding the fact that one team may be pulling stronger than the other the two sides of the machine will receive this strain uniformly.

By the expression "running connection" employed to designate the chain-and-pulley connection between the ends of the two evener-levers is meant to include any connection of these parts which will cause the strain applied to one evener-lever to be transmitted and applied to the other.

In Fig. 4, which shows the device arranged for four horses, the swingletree for the middle horse is omitted, but the running connection of the inner ends of the evener-levers is preserved, the pulley Q, around which the chain passes, being connected with the equalizing-bar at the middle of the same. In this arrangement the two teams equalize each other; but, as in the case just described, a sudden pull by one team will be transmitted to the opposite side of the machine.

In Fig. 5 the construction is the same as that shown in Fig. 4 except that the animals of one team travel respectively at the outer side of the tongue and between the tongues, the other team, as in the other cases described, traveling at the outer side of the other tongue. In this arrangement the four horses are attached so that there will be no interval between the tongues. The theory of action is the same, however, as that of the arrangement shown in Fig. 4.

In Fig. 6, which shows the device adjusted for three horses, the long equalizing-bar carrying the outer doubletrees H and I for the two outer teams is omitted, and in place of the same the swingletrees F and G, before alluded to, are employed and are connected with the brackets of the pulleys C and D, so that one horse travels at the outer side of each tongue and the third horse travels between the tongues, being attached to a central swingletree S, connected with the inner ends of the evener-levers by a chain $s$ and a pulley $s'$, the latter being connected by a link $s^2$ with the swingletree and the chain passing around the pulley and having its ends connected, as in the first instance described, with the inner extremities of the evener-levers. In this embodiment of our invention the strain on the animals is equalized in the same manner as in the construction of Figs. 1, 2, and 3, it being necessary, of course, to change the fulcrums of the evener-levers in order that the middle horse may be enabled to resist the pull of the two outer horses instead of four horses. To provide for this change of the fulcrums, the evener-levers are formed with a number of pivoting-holes arranged side by side lengthwise and adapted to receive the pivot-pins.

It will be observed, therefore, that in all of the different embodiments of our invention, as illustrated by the several figures, the strain on the horses is apportioned equally among them, and the pull of the latter is applied equally to the two sides of the machine, notwithstanding the fact that one team or horse may pull stronger than another. Further, it will be seen that the pull of the draft-animals on the machine will have a tendency to lift the same at the front, so that the objectionable neck-weight, so trying and injurious to the animals, will be eliminated.

The two evener-levers 1 and 2, operatively connected together, as described, constitute, in effect, an evener mechanism having a pivotal connection with the machine or vehicle, which mechanism is flexibly connected at two points with the frame of the machine by means of the two chains A and B, which connections are independent of the pivotal connections of the mechanism with the machine. The draft devices, either in the form of the swingletrees shown in Fig. 6 or those shown in the other figures, are operatively connected with the flexible connections in the one case directly to the pulleys C and D and in the other case indirectly through the medium of the equalizing-bar E.

Having thus described our invention, what we claim is—

1. A draft-equalizer comprising in combination, a transverse pivotal evener mechanism, flexible connecting devices between the evener mechanism and the machine-frame said connecting devices having one of their ends connected with the evener mechanism and their opposite ends connected fixedly with the machine-frame and draft devices connected with each of said flexible connections.

2. A draft-equalizer comprising in combination, a transverse pivotal evener mechanism, ropes or chains connected with said mechanism and having a fixed connection with the machine-frame, movable guides or pulleys around which said ropes or chains pass, and draft devices operatively connected with said guides, for the attachment of the draft-animals.

3. A draft-equalizer comprising in combination, two evener-levers adapted to be pivotally supported by the machine, chains or ropes connected with the outer ends of the evener-levers and adapted to be connected also with the machine, guides or pulleys around which the chains pass, draft devices operatively connected with said guides or pulleys, for the attachment of the draft-animals, and a suitable connection between the inner ends of the evener-levers.

4. In combination with a machine, two evener-levers pivotally mounted thereon, chains connected at their ends respectively with the evener-levers and with the machine, pulleys over which the chains pass, and draft devices operatively connected with the pulleys, for the attachment of the draft-animals.

5. In combination with the machine, two evener-levers pivotally sustained thereby, a running connection between the inner ends of the levers, chains connected with the outer ends of the levers and with the frame of the machine, pulleys around which the chains pass, and draft devices operatively connected with the pulleys, for the attachment of the draft-animals.

6. A draft-equalizer comprising in combination, two evener-levers arranged end to end and adapted to be pivotally supported by the machine, a chain connected at its ends to the inner ends of said levers, a pulley or guide around which the chain passes, chains having their upper ends connected with the outer ends of the evener-levers and having their lower ends adapted to be connected with the machine, vertical pulleys around which said last-mentioned chains pass, and draft devices connected with said vertical pulleys, for the attachment of the draft-animals.

7. A draft-equalizer comprising in combination, two evener-levers adapted to be pivotally supported by the machine, a running connection between the inner ends of said levers, a draft device for the attachment of a draft-animal operatively connected with the running connection, two chains connected at one of their ends with the outer ends of the evener-levers and adapted to have their opposite ends connected with the machine, pulleys around which said chains pass, and draft devices operatively connected with said pulleys, for the attachment of additional draft-animals.

8. A draft-equalizer comprising in combination, evener-levers supported by the machine, a suitable connection between the inner ends of the levers, flexible connections between the outer ends of the levers and the machine, and draft devices for the attachment of the animals, said draft devices being operatively connected with the flexible connections.

9. A draft-equalizer comprising in combination, evener-levers supported by the machine, a running connection between the inner ends of the levers, flexible connections between the outer ends of said levers and the machine, and draft devices for the attachment of draft-animals, said draft devices having a running connection with said flexible connections.

10. A draft-equalizer comprising in combination, evener-levers adapted to be supported by the machine, a suitable connection between the inner ends of said levers, chains or ropes connected with the opposite ends of the levers and adapted to be connected with the machine, guides or pulleys around which said chains pass, an equalizing-bar connected with said guides or pulleys, and draft devices connected with the equalizing-bar, for the attachment of draft-animals.

11. The combination of evener-levers supported by the machine, a running connection between the inner ends of said levers, chains connected with the outer ends of the levers and with the machine, pulleys around which said chains pass, an equalizing-bar connected with said pulleys, doubletrees connected with said equalizing-bar, and swingletrees connected with said doubletrees, for the attachment of the draft-animals.

12. The combination of two evener-levers pivotally connected with the machine, a chain connecting the inner ends of the same, a pulley Q around which said chain passes, a swingletree connected with said pulley, chains connecting the outer ends of the evener-levers with the machine, pulleys C and D around which said chains pass, an equalizing-bar connected with the pulleys C and D, doubletrees connected with the equalizing-bar, and swingletrees connected with said doubletrees.

13. In combination with the machine, a fixed arm, having its lower end terminating below the axis of the carrying-wheels, an evener mechanism sustained by the machine, a connection between the evener mechanism and said arm adapted to transmit to the arm the draft applied to said connection and draft devices operatively connected with said connection; whereby the pull of the draft-animals will have a tendency to lift the machine and relieve "neck-weight" on the animals.

14. In combination with a machine, two evener-levers mounted thereon, two fixed arms extending below the axis of the carrying-wheels, flexible connections between said arms and the evener-levers, and draft devices for the attachment of the draft-animals, said draft devices being operatively connected with the flexible connections.

15. In combination with the machine, fixed arms extending downwardly and forwardly from the axle thereof, an evener mechanism operatively connected with said arms, and draft devices operatively connected with the evener mechanism, for the attachment of the draft-animals.

16. In combination with the machine, two arms extending downwardly and forwardly from the axle, two evener-levers pivotally sustained by the machine and arranged end to end, chains connected at their upper ends with the outer ends of said evener-levers and connected at their lower ends with the ends of said arms, vertical pulleys around which said chains pass, draft devices for the attachment of draft-animals operatively connected with said pulleys, and a connection between the inner ends of said evener-levers.

In testimony whereof we hereunto set our hands, this 29th day of May, 1905, in the presence of two attesting witnesses.

SILAS E. BAILOR.
FRED M. ASHE.

Witnesses:
A. R. WOODFORD,
M. H. RHODES.